(12) United States Patent
Lou et al.

(10) Patent No.: US 8,995,082 B1
(45) Date of Patent: Mar. 31, 2015

(54) REDUCING ACOUSTIC NOISE IN A DISK DRIVE WHEN EXITING IDLE MODE

(71) Applicant: Western Digital Technologies, Inc., Irvine, CA (US)

(72) Inventors: Mingji Lou, Corona, CA (US); Orhan Beker, Dove Canyon, CA (US); Jenghung Chen, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/263,511

(22) Filed: Apr. 28, 2014

Related U.S. Application Data

(62) Division of application No. 13/153,282, filed on Jun. 3, 2011, now Pat. No. 8,760,796.

(51) Int. Cl.
*G11B 5/596* (2006.01)
*G11B 5/584* (2006.01)
*G11B 5/55* (2006.01)

(52) U.S. Cl.
CPC .................................. *G11B 5/5526* (2013.01)
USPC ..................................... 360/78.06; 360/78.14

(58) Field of Classification Search
None
See application file for complete search history.

(56) References Cited

U.S. PATENT DOCUMENTS

| | | | |
|---|---|---|---|
| 5,291,110 A | 3/1994 | Andrews, Jr. et al. | |
| 5,465,034 A | 11/1995 | Andrews, Jr. et al. | |
| 5,475,545 A | 12/1995 | Hampshire et al. | |
| 5,901,009 A | 5/1999 | Sri-Jayantha et al. | |
| 5,963,392 A | 10/1999 | Sri-Jayantha et al. | |
| 6,013,995 A | 1/2000 | Kim | |
| 6,014,283 A | 1/2000 | Codilian et al. | |
| 6,018,432 A | 1/2000 | Ukani | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |

(Continued)

OTHER PUBLICATIONS

T. Yamaguchi et al., "Improvement of Servo Robustness for Digital Sector Servo System,", IEEE Trans. of Magnetics, vol. 28, No. 5, Sep. 1992, pp. 2910-2912.

*Primary Examiner* — Andrew L Sniezek

(57) ABSTRACT

A disk drive is disclosed comprising a head actuated over a disk comprising a plurality of tracks, wherein each track comprises a plurality of servo sectors. When entering an idle mode, the head is floated over the disk, and when exiting the idle mode, a radial velocity of the head is measured, a seek distance is determined in response to the radial velocity, and a seek operation seeks the head the seek distance to a first track.

12 Claims, 5 Drawing Sheets

(56) References Cited

U.S. PATENT DOCUMENTS

| | | |
|---|---|---|
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,396,653 B1 | 5/2002 | Haines et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,757,481 B1 | 6/2004 | Nazarian et al. |
| 6,760,186 B1 | 7/2004 | Codilian et al. |
| 6,762,571 B2 | 7/2004 | Min et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,289,291 B1 | 10/2007 | Schlumberger |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,359,140 B2 | 4/2008 | Chung |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |

(56) References Cited

U.S. PATENT DOCUMENTS

| | | | |
|---|---|---|---|
| 7,457,071 B1 | 11/2008 | Sheh | |
| 7,466,509 B1 | 12/2008 | Chen et al. | |
| 7,468,855 B1 | 12/2008 | Weerasooriya et al. | |
| 7,477,471 B1 | 1/2009 | Nemshick et al. | |
| 7,480,116 B1 | 1/2009 | Bennett | |
| 7,489,464 B1 | 2/2009 | McNab et al. | |
| 7,492,546 B1 | 2/2009 | Miyamura | |
| 7,495,857 B1 | 2/2009 | Bennett | |
| 7,499,236 B1 | 3/2009 | Lee et al. | |
| 7,502,192 B1 | 3/2009 | Wang et al. | |
| 7,502,195 B1 | 3/2009 | Wu et al. | |
| 7,502,197 B1 | 3/2009 | Chue | |
| 7,505,223 B1 | 3/2009 | McCornack | |
| 7,542,225 B1 | 6/2009 | Ding et al. | |
| 7,548,392 B1 | 6/2009 | Desai et al. | |
| 7,551,390 B1 | 6/2009 | Wang et al. | |
| 7,558,016 B1 | 7/2009 | Le et al. | |
| 7,573,670 B1 | 8/2009 | Ryan et al. | |
| 7,576,941 B1 | 8/2009 | Chen et al. | |
| 7,580,212 B1 | 8/2009 | Li et al. | |
| 7,583,470 B1 | 9/2009 | Chen et al. | |
| 7,595,954 B1 | 9/2009 | Chen et al. | |
| 7,602,575 B1 | 10/2009 | Lifchits et al. | |
| 7,616,399 B1 | 11/2009 | Chen et al. | |
| 7,619,844 B1 | 11/2009 | Bennett | |
| 7,619,849 B2 | 11/2009 | Uchida et al. | |
| 7,626,782 B1 | 12/2009 | Yu et al. | |
| 7,630,162 B2 | 12/2009 | Zhao et al. | |
| 7,639,447 B1 | 12/2009 | Yu et al. | |
| 7,656,604 B1 | 2/2010 | Liang et al. | |
| 7,656,607 B1 | 2/2010 | Bennett | |
| 7,660,067 B1 | 2/2010 | Ji et al. | |
| 7,660,070 B2 | 2/2010 | Frisby et al. | |
| 7,663,835 B1 | 2/2010 | Yu et al. | |
| 7,675,707 B1 | 3/2010 | Liu et al. | |
| 7,679,854 B1 | 3/2010 | Narayana et al. | |
| 7,688,534 B1 | 3/2010 | McCornack | |
| 7,688,538 B1 | 3/2010 | Chen et al. | |
| 7,688,539 B1 | 3/2010 | Bryant et al. | |
| 7,697,233 B1 | 4/2010 | Bennett et al. | |
| 7,701,661 B1 | 4/2010 | Bennett | |
| 7,710,676 B1 | 5/2010 | Chue | |
| 7,715,138 B1 | 5/2010 | Kupferman | |
| 7,729,079 B1 | 6/2010 | Huber | |
| 7,733,189 B1 | 6/2010 | Bennett | |
| 7,746,592 B1 | 6/2010 | Liang et al. | |
| 7,746,594 B1 | 6/2010 | Guo et al. | |
| 7,746,595 B1 | 6/2010 | Guo et al. | |
| 7,760,461 B1 | 7/2010 | Bennett | |
| 7,800,853 B1 | 9/2010 | Guo et al. | |
| 7,800,856 B1 | 9/2010 | Bennett et al. | |
| 7,800,857 B1 | 9/2010 | Calaway et al. | |
| 7,839,591 B1 | 11/2010 | Weerasooriya et al. | |
| 7,839,595 B1 | 11/2010 | Chue et al. | |
| 7,839,600 B1 | 11/2010 | Babinski et al. | |
| 7,843,662 B1 | 11/2010 | Weerasooriya et al. | |
| 7,852,588 B1 | 12/2010 | Ferris et al. | |
| 7,852,592 B1 | 12/2010 | Liang et al. | |
| 7,864,481 B1 | 1/2011 | Kon et al. | |
| 7,864,482 B1 | 1/2011 | Babinski et al. | |
| 7,869,155 B1 | 1/2011 | Wong | |
| 7,876,522 B1 | 1/2011 | Calaway et al. | |
| 7,876,523 B1 | 1/2011 | Panyavoravaj et al. | |
| 7,916,415 B1 | 3/2011 | Chue | |
| 7,916,416 B1 | 3/2011 | Guo et al. | |
| 7,916,420 B1 | 3/2011 | McFadyen et al. | |
| 7,916,422 B1 | 3/2011 | Guo et al. | |
| 7,929,238 B1 | 4/2011 | Vasquez | |
| 7,961,422 B1 | 6/2011 | Chen et al. | |
| 8,000,053 B1 | 8/2011 | Anderson | |
| 8,031,423 B1 | 10/2011 | Tsai et al. | |
| 8,054,022 B1 | 11/2011 | Ryan et al. | |
| 8,059,357 B1 | 11/2011 | Knigge et al. | |
| 8,059,360 B1 | 11/2011 | Melkote et al. | |
| 8,072,703 B1 | 12/2011 | Calaway et al. | |
| 8,077,428 B1 | 12/2011 | Chen et al. | |
| 8,078,901 B1 | 12/2011 | Meyer et al. | |
| 8,081,395 B1 | 12/2011 | Ferris | |
| 8,085,020 B1 | 12/2011 | Bennett | |
| 8,116,023 B1 | 2/2012 | Kupferman | |
| 8,145,934 B1 | 3/2012 | Ferris et al. | |
| 8,179,626 B1 | 5/2012 | Ryan et al. | |
| 8,189,286 B1 | 5/2012 | Chen et al. | |
| 8,213,106 B1 | 7/2012 | Guo et al. | |
| 8,254,222 B1 | 8/2012 | Tang | |
| 8,300,348 B1 | 10/2012 | Liu et al. | |
| 8,315,005 B1 | 11/2012 | Zou et al. | |
| 8,320,069 B1 | 11/2012 | Knigge et al. | |
| 8,351,174 B1 | 1/2013 | Gardner et al. | |
| 8,358,114 B1 | 1/2013 | Ferris et al. | |
| 8,358,145 B1 | 1/2013 | Ferris et al. | |
| 8,390,367 B1 | 3/2013 | Bennett | |
| 8,432,031 B1 | 4/2013 | Agness et al. | |
| 8,432,629 B1 | 4/2013 | Rigney et al. | |
| 8,451,697 B1 | 5/2013 | Rigney et al. | |
| 8,482,873 B1 | 7/2013 | Chue et al. | |
| 8,498,076 B1 | 7/2013 | Sheh et al. | |
| 8,498,172 B1 | 7/2013 | Patton, III et al. | |
| 8,508,881 B1 | 8/2013 | Babinski et al. | |
| 8,531,798 B1 | 9/2013 | Xi et al. | |
| 8,537,486 B2 | 9/2013 | Liang et al. | |
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,605,382 B1 | 12/2013 | Mallary et al. | |
| 8,605,384 B1 | 12/2013 | Liu et al. | |
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2 | 1/2014 | Bennett et al. | |
| 8,630,059 B1 | 1/2014 | Chen et al. | |
| 8,634,154 B1 | 1/2014 | Rigney et al. | |
| 8,634,283 B1 | 1/2014 | Rigney et al. | |
| 8,643,976 B1 | 2/2014 | Wang et al. | |
| 8,649,121 B1 | 2/2014 | Smith et al. | |
| 8,654,466 B1 | 2/2014 | McFadyen | |
| 8,654,467 B1 | 2/2014 | Wong et al. | |
| 8,665,546 B1 | 3/2014 | Zhao et al. | |
| 8,665,551 B1 | 3/2014 | Rigney et al. | |
| 8,670,206 B1 | 3/2014 | Liang et al. | |
| 8,687,312 B1 | 4/2014 | Liang | |
| 8,693,123 B1 | 4/2014 | Guo et al. | |
| 8,693,134 B1 | 4/2014 | Xi et al. | |
| 8,699,173 B1 | 4/2014 | Kang et al. | |
| 8,711,027 B1 | 4/2014 | Bennett | |
| 8,717,696 B1 | 5/2014 | Ryan et al. | |
| 8,717,699 B1 | 5/2014 | Ferris | |
| 8,717,704 B1 | 5/2014 | Yu et al. | |
| 8,724,245 B1 | 5/2014 | Smith et al. | |
| 8,724,253 B1 | 5/2014 | Liang et al. | |
| 8,724,524 B2 | 5/2014 | Urabe et al. | |
| 8,737,008 B1 | 5/2014 | Watanabe et al. | |
| 8,737,013 B2 | 5/2014 | Zhou et al. | |
| 8,743,495 B1 | 6/2014 | Chen et al. | |
| 8,743,503 B1 | 6/2014 | Tang et al. | |
| 8,743,504 B1 | 6/2014 | Bryant et al. | |
| 8,749,904 B1 | 6/2014 | Liang et al. | |
| 8,760,796 B1 | 6/2014 | Lou et al. | |
| 2009/0262446 A1* | 10/2009 | Mochizuki et al. | 360/31 |
| 2010/0035085 A1 | 2/2010 | Jung et al. | |
| 2010/0290161 A1* | 11/2010 | Ng et al. | 360/256 |
| 2011/0188154 A1* | 8/2011 | Chokki et al. | 360/77.02 |
| 2012/0284493 A1 | 11/2012 | Lou et al. | |
| 2013/0120870 A1 | 5/2013 | Zhou et al. | |
| 2013/0148240 A1 | 6/2013 | Ferris et al. | |

\* cited by examiner

FIG. 3C $\quad J = \sum_{k=0}^{\infty} X(k)^T \cdot Q \cdot X(k)$

REDUCING ACOUSTIC NOISE IN A DISK DRIVE WHEN EXITING IDLE MODE

CROSS REFERENCE TO RELATED APPLICATION

This application is a divisional of U.S. patent application Ser. No. 13/153,282, filed on Jun. 3, 2011, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Acoustic noise may be a significant concern when designing a disk drive, particularly for certain consumer applications, such as digital video recorders. If a disk drive frequently enters an idle mode, there may be acoustic noise generated when exiting the idle mode. Accordingly, it is desirable to modify operation of a disk drive in order to reduce the acoustic noise caused by exiting an idle mode.

BRIEF DESCRIPTION OF THE DRAWINGS

FIG. 3C shows an equation for computing a performance index according to an embodiment of the present invention wherein Q is a weighting matrix optimized to reduce acoustic noise.

DETAILED DESCRIPTION OF EMBODIMENTS OF THE INVENTION

Figure 1A:
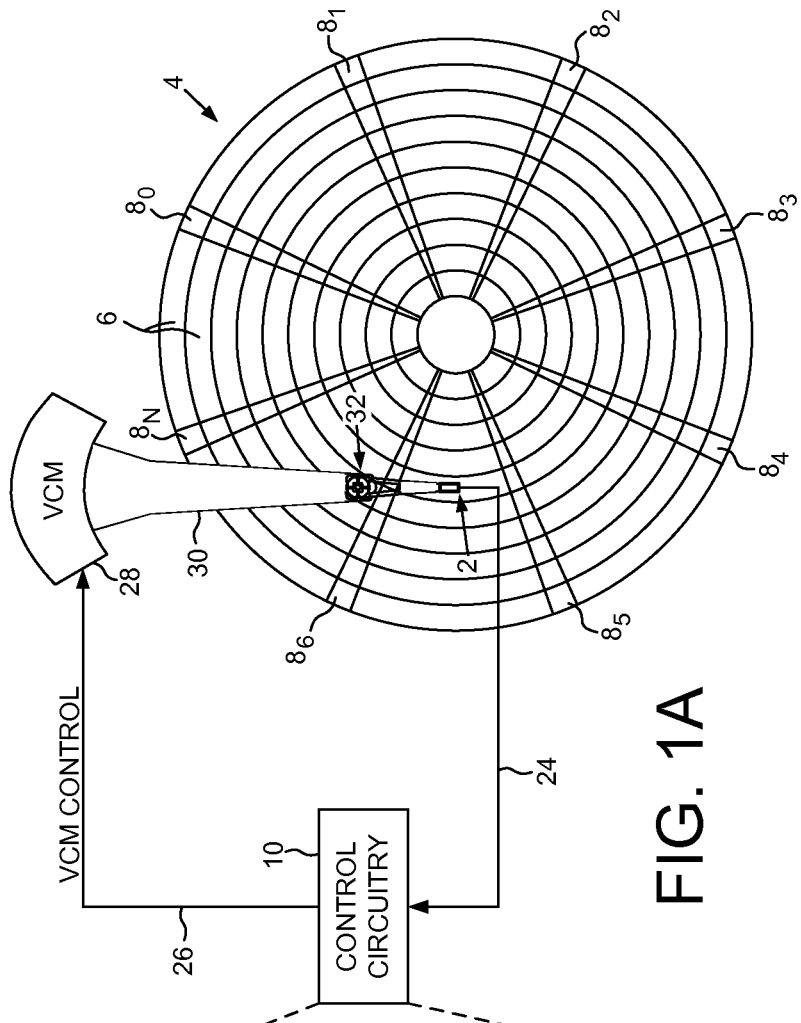
FIG. 1A shows a disk drive according to an embodiment of the present invention comprising a head actuated over a disk.

FIG. 1A shows a disk drive according to an embodiment of the present invention comprising a head 2 actuated over a disk 4 comprising a plurality of tracks 6, wherein each track comprises a plurality of servo sectors $8_0$-$8_N$. The disk drive further comprises control circuitry 10 operable to execute the flow diagram of FIG. 1B, wherein when entering an idle mode (step 12), the head is floated over the disk (step 14), and when exiting the idle mode (step 16), a radial velocity of the head is measured (step 18), a seek distance is determined in response to the radial velocity (step 20), and a seek operation seeks the head the seek distance to a first track (step 22).

In the embodiment of FIG. 1A, the control circuitry 10 processes a read signal 24 emanating from the head 2 to demodulate the servo sectors $8_0$-$8_N$ into one or more estimated states of a servo system (e.g., velocity or position). The estimated state is compared to a target state to generate an error signal that is filtered with a suitable servo compensator to generate a control signal applied to an actuator, such as a current 26 applied to a voice coil motor 28 which rotates an actuator arm 30 about a pivot in order to actuate the head 2 radially over the disk 4 during seek, settle, and tracking operations. In some embodiments, the disk drive may also utilize a microactuator for assisting the settle and tracking operations, such as a piezoelectric (PZT) microactuator 32 that actuates a suspension coupled to a distal end of the actuator arm 30.

When the disk drive enters an idle mode (e.g., when not servicing access commands), the servo system for actuating the head over the disk may be disabled in order to conserve power. In one embodiment, while the servo system is disabled the head essentially floats over the disk surface. When the disk drive exits the idle mode (e.g., to service an access command), the control circuitry seeks the head to a first track, and then seeks the head to a second track corresponding to the access command. The multiple seeks performed when exiting the idle mode may result in undesirable acoustic noise. Accordingly, in the embodiments of the present invention the servo system is modified in order to reduce acoustic noise when exiting the idle mode.

In one embodiment, when exiting the idle mode a first seek operation seeks the head from its initial floating position to a first track, and then a second seek operation seeks the head from the first track to a target track of the next access command. In order to reduce the acoustic noise, the seek distance for the first seek operation is determined based on a measured radial velocity of the head when exiting the idle mode. For example, in one embodiment the seek distance of the first seek operation is proportional to the radial velocity of the head so that the faster the head is moving immediately after exiting the idle mode the longer the seek distance to the first track. This embodiment may help reduce acoustic noise by limiting the deceleration of the head toward the first track.

Figure 1C:
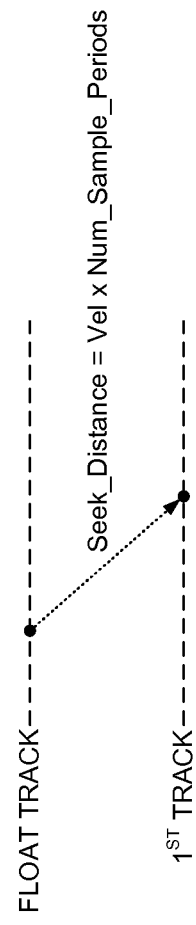
FIG. 1C illustrates an embodiment of the present invention wherein the seek distance is determined based on a predetermined number of servo sectors expected to be crossed during the seek (i.e., based on an expected time to execute the seek from the float track to the first track).

FIG. 1C shows an embodiment of the present invention wherein the seek distance from the initial float track to the first track is determined based on the radial velocity of the head and a number of sample periods designated to perform the first seek operation (seek time). In one embodiment, the number of sample periods corresponds to a number of servo sectors the head will pass over during a predetermined time interval corresponding to the designated seek time. The number of servo sectors the head will pass over during the predetermined time interval depends on the rotational velocity of the disk. The radial velocity of the head is measured in terms of a number of tracks the head will cross in a single sample period (single servo wedge), such that the seek distance is computed by multiplying the radial velocity of the head by the number of sample periods designated for the first seek operation. In one embodiment, the radial velocity of the head is determined by measuring a number of tracks crossed per servo wedge when exiting the idle mode. Other embodiments may estimate the radial velocity of the head based on a back electromotive force (BEMF) voltage generated by the voice coil of the VCM 28 which is proportional to the radial velocity of the head.

Figure 1B:
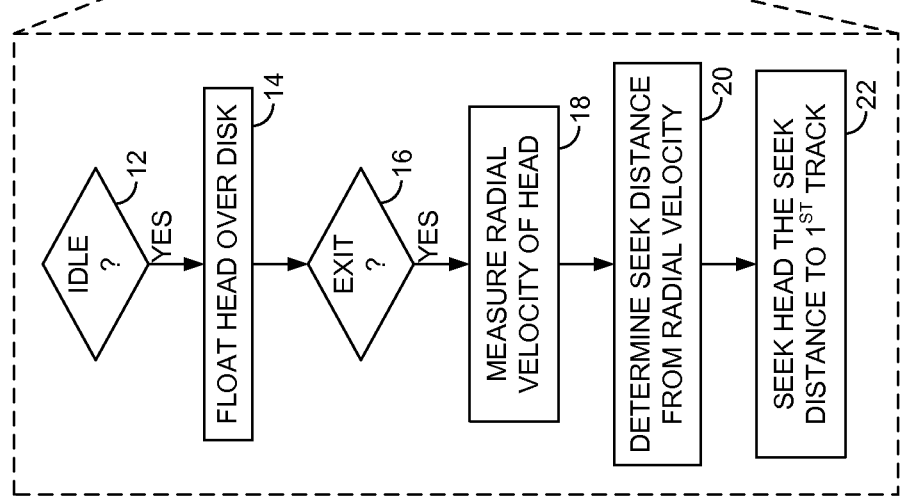
FIG. 1B is a flow diagram according to an embodiment of the present invention wherein when entering an idle mode the head is floated over the disk, and when exiting the idle mode a radial velocity of the head is measured and used to determine a seek distance to a first track.
Figure 2:
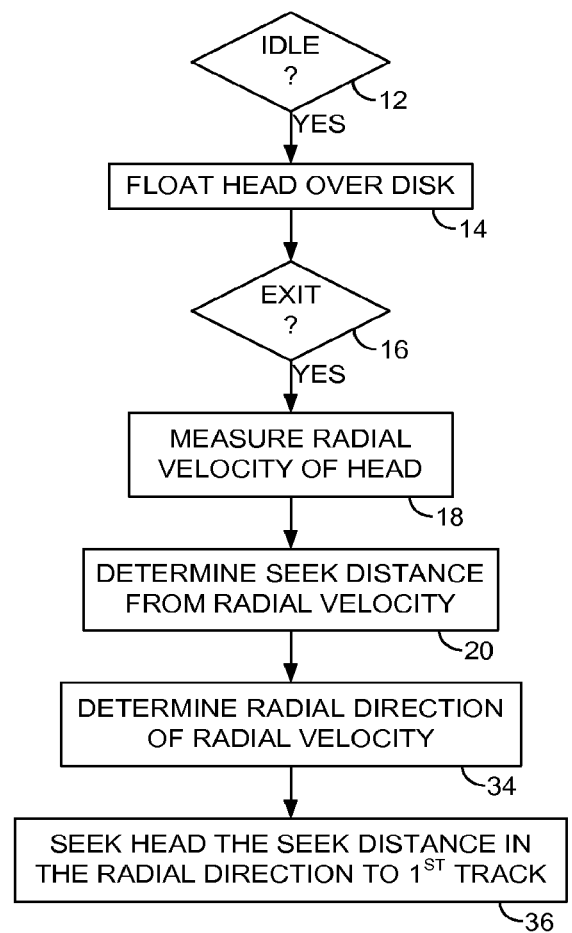
FIG. 2 is a flow diagram according to an embodiment of the present invention wherein the seek distance to the first track is determined based on the direction of the measured radial velocity (i.e., toward an inner or outer diameter of the disk).

FIG. 2 is a flow diagram which extends on the flow diagram of FIG. 1B, wherein in addition to determining the radial velocity of the head (step 20) a radial direction of the head is determined when exiting the idle mode (step 34). The control circuitry then seeks the head in the same radial direction as the initial radial direction of the head (step 36). That is, the control circuitry determines the seek distance based on the radial velocity of the head, and then determines the first track to seek to based on the radial direction of the head. For example, if the head is initially moving toward the inner diameter of the disk, the first track to seek to is selected toward the inner diameter of the disk away from the head, whereas if the head is initially moving toward the outer diameter of the disk, the first track to seek to is selected toward the outer diameter of the disk away from the head. In this manner, the control circuitry decelerates the head toward the first track without needing to reverse direction.

Figure 3A:
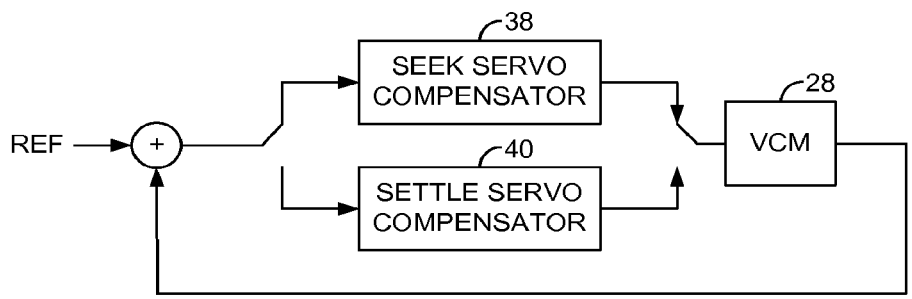
FIG. 3A shows an embodiment of the present invention wherein the disk drive comprises a seek servo compensator and a settle servo compensator.
Figure 3B:
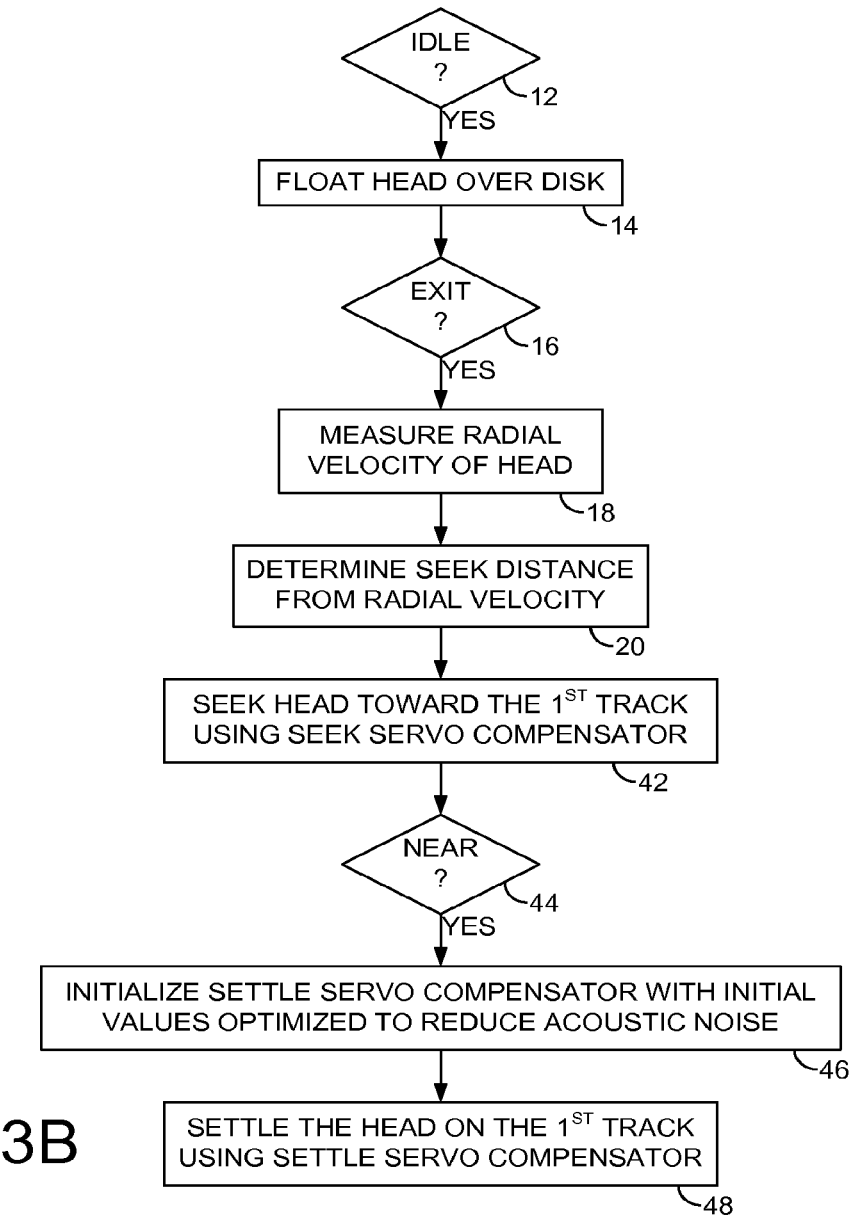
FIG. 3B is a flow diagram according to an embodiment of the present invention wherein the settle servo compensator is initialized with values optimized to reduce acoustic noise.

FIG. 3A shows an embodiment of the present invention wherein the servo loop for actuating the head over the disk comprises a seek servo compensator 38 used during seek operations, and a settle servo compensator 40 used during settle operations, wherein when exiting the idle mode the settle servo compensator is initialized with values that reduce acoustic noise. This embodiment is understood with reference to the flow diagram of FIG. 3B wherein after determining the seek distance to the first track (step 20) the control circuitry seeks the head toward the first track using the seek servo compensator (step 42). When the head approaches the first track (step 44), the control circuitry initializes the settle servo compensator with values optimized to reduce acoustic noise (step 46), and then settles the head onto the first track using the settle servo compensator (step 48). The settle servo compensator may be initialized with the initial values at any suitable time, such as during the seek operation, or just after switching to the settle operation.

The initial values that help reduce acoustic noise for the settle servo compensator may be generated in any suitable manner, and in one embodiment, the initial values may be generated based on a performance index computed using the equation of FIG. 3C. Further details concerning the equation of FIG. 3C are disclosed in the technical article by T. Yamaguchi, et al., "IMPROVEMENT OF SERVO ROBUSTNESS FOR DIGITAL SECTOR SERVO SYSTEM", IEEE Transactions on Magnetics, Vol. 28, No. 5, September 1992, the disclosure of which is incorporated herein by reference. In the aforementioned technical article, the Q weighting matrix for computing the performance index of FIG. 3C is optimized to reduce the settle time of the settle operation (improve settle performance). In an embodiment of the present invention, the Q weighting matrix for computing the performance index of FIG. 3C is optimized to reduce acoustic noise of the settle operation (improve acoustic performance). In one embodiment, a number of different Q weighting matrices may be generated corresponding to different seek profiles, wherein the seek profile may be selected based on the initial radial velocity of the head and the seek distance to the first track.

Figure 3D:
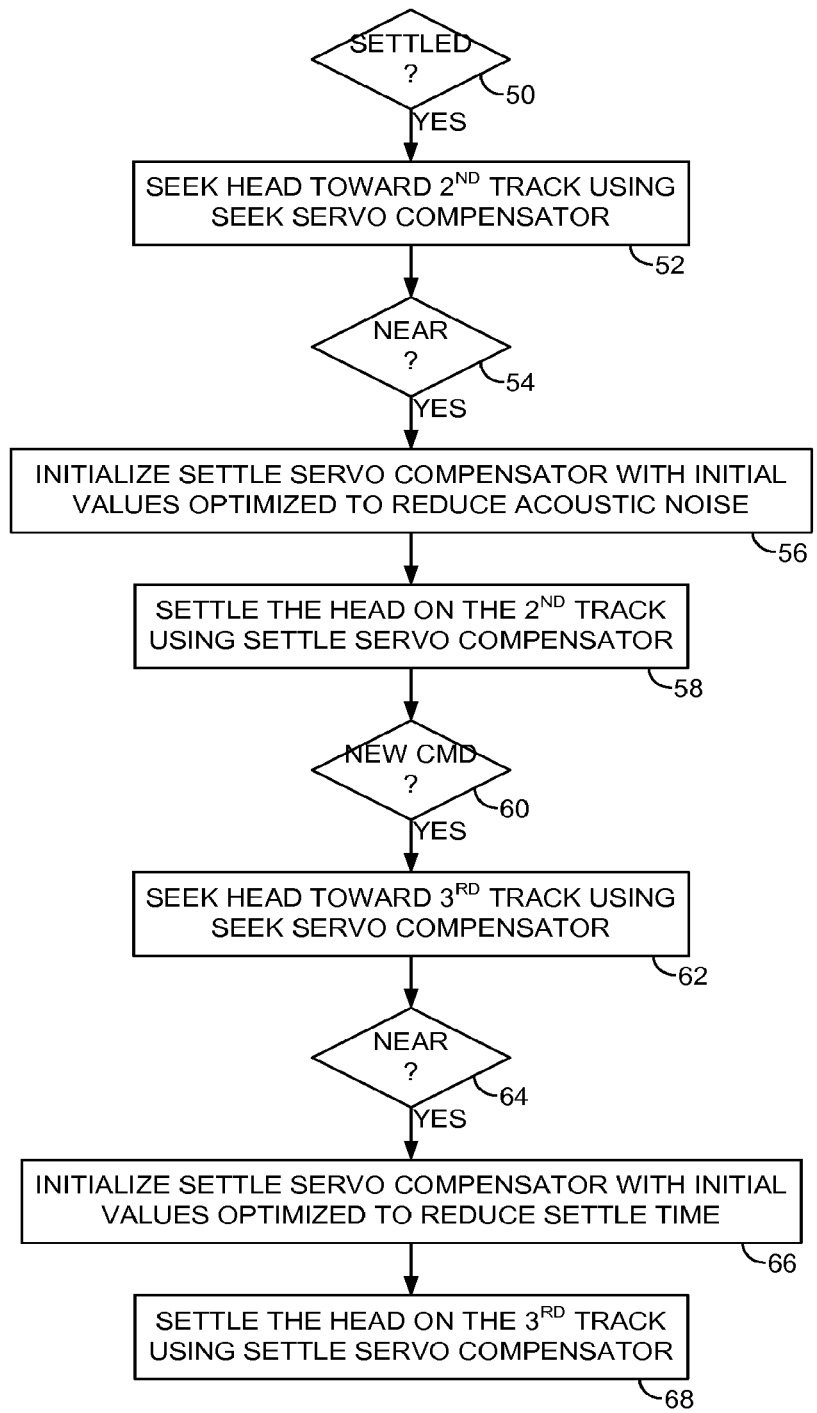
FIG. 3D is a flow diagram according to an embodiment of the present invention wherein the settle servo loop is initialized with values optimized to reduce acoustic noise when seeking from the first to the second track, and then initialized with values optimized to reduce the settle time when seeking from the second to a third track.

In one embodiment, the settle servo compensator is initialized with values that reduce acoustic noise during at least the first two seeks performed after exiting the idle mode. This embodiment is understood with reference to the flow diagram of FIG. 3D wherein after settling the head onto the first track (step 50) using initial values that reduce acoustic noise, the control circuitry seeks the head toward a second track (corresponding to an access command) using the seek servo compensator (step 52). When the head approaches the second track (step 54), the control circuitry initializes the settle servo compensator using values that reduce acoustic noise (step 56) and then settles the head onto the second track using the settle servo compensator (step 58). When a new access command is received (step 60), the control circuitry seeks the head toward a third track using the seek servo compensator (step 62). When the head approaches the third track (step 64), the control circuitry initializes the settle servo compensator using values that reduce the settle time (step 66) and then settles the head onto the second track using the settle servo compensator (step 68). In one embodiment, the Q weighting matrix described above with reference to FIG. 3C may be optimized to reduce acoustic noise or reduce the settle time in the flow diagram of FIG. 3D.

Figure 4A:
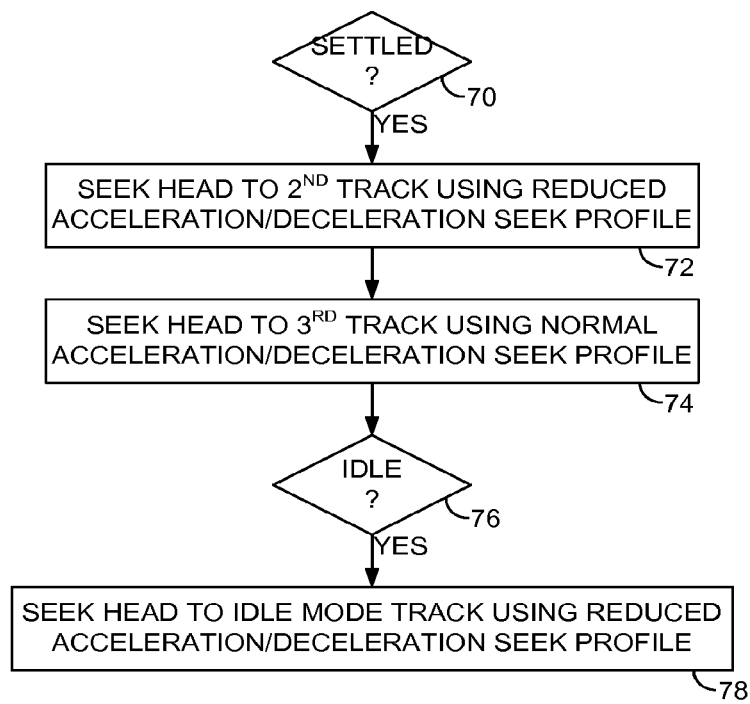
FIG. 4A is a flow diagram according to an embodiment of the present invention wherein a reduced acceleration/deceleration seek profile is used to seek the head from the first track to a second track in order to reduce acoustic noise.
Figure 4B:
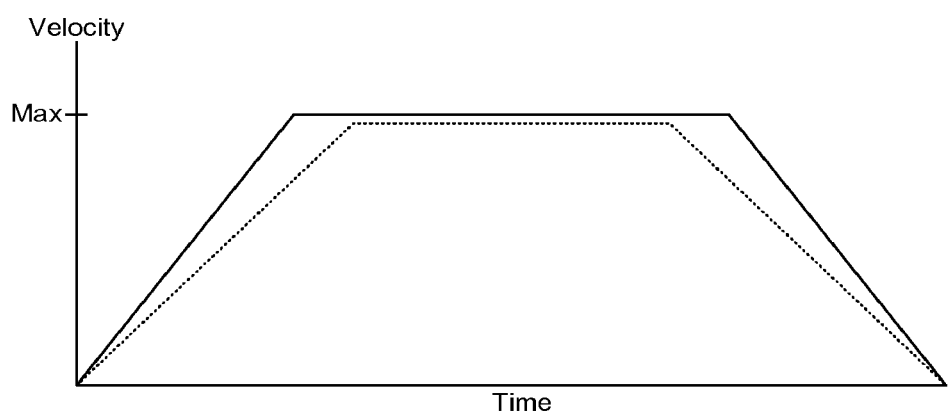
FIG. 4B illustrates a reduced acceleration/deceleration seek profile according to an embodiment of the present invention.

FIGS. 4A and 4B illustrate another embodiment of the present invention for reducing acoustic noise when exiting the idle mode, wherein after seeking to and settling on the first track (step 70), the control circuitry seeks the head from the first track to a second track (corresponding to a first access command) using a first idle mode seek profile (step 72), and then seeks the head from the second track to a third track (corresponding to a next access command) using a normal seek profile (step 74). The first idle mode seek profile comprises an acceleration/deceleration that is less than the acceleration/deceleration of the normal seek profile as illustrated in FIG. 4B which helps reduce acoustic noise when exiting the idle mode. In one embodiment, the maximum seek velocity of the first idle mode seek profile may also be less than the maximum seek velocity of the normal seek profile which may further reduce acoustic noise.

FIG. 4A also illustrates another embodiment of the present invention wherein when entering the idle mode (step 76), the control circuitry may seek the head to an idle mode track (prior to floating the head) using a second idle mode seek profile comprising an acceleration/deceleration less than that of the normal seek profile (step 78). The first idle mode seek profile may be the same or different from the second idle mode seek profile. Seeking to the idle mode track using reduced acceleration/deceleration helps reduce acoustic noise, particularly when the disk drive remains in the idle mode for a short duration. That is, modifying the servo system to reduce acoustic noise when entering the idle mode may help reduce acoustic noise associated with exiting the idle mode when the seek/settle operations are performed in close proximity due to a short idle time. In one embodiment, when entering the idle mode and settling on the idle mode track, the settle servo compensator is initialized with values that reduce acoustic noise similar to when exiting the idle mode as described above.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of tracks, wherein each track comprises a plurality of servo sectors;
a head actuated over the disk; and
control circuitry comprising a servo control system to actuate the head over the disk, the control circuitry operable to:
when entering an idle mode, disable the servo control system in order to float the head over the disk; and
when exiting the idle mode:
enable the servo system;
measure a radial velocity of the head;
determine a seek distance in response to the radial velocity; and
seek the head the seek distance to a first track,
wherein the control circuitry comprises a seek servo compensator and a settle servo compensator for controlling movement of the head, and the control circuitry is further operable to:
seek the head toward the first track using the seek servo compensator;
initialize the settle servo compensator with initial values; and
settle the head on the first track using the settle servo compensator,
wherein the initial values are generated according to a performance index:

$$\sum_{k=0}^{\infty} X(k)^T \cdot Q \cdot X(k)$$

where:
X(k) represents internal states of the settle servo compensator;
X(0) represents an initial state initialized with the initial values; and
Q is a weighting matrix optimized to reduce acoustic noise.

2. A disk drive comprising:
a disk comprising a plurality of tracks, wherein each track comprises a plurality of servo sectors;
a head actuated over the disk; and
control circuitry comprising a seek servo compensator and a settle servo compensator for controlling movement of the head, the control circuitry operable to:
when entering an idle mode, float the head over the disk; and
when exiting the idle mode:
seek the head toward a first track using the seek servo compensator;
initialize the settle servo compensator with initial values; and
settle the head on the first track using the settle servo compensator,
wherein the initial values are generated according to a performance index:

$$\sum_{k=0}^{\infty} X(k)^T \cdot Q \cdot X(k)$$

where:
X(k) represents internal states of the settle servo compensator;
X(0) represents an initial state initialized with the initial values; and
Q is a weighting matrix optimized to reduce acoustic noise.

3. The disk drive as recited in claim 2, wherein when exiting the idle mode the control circuitry is further operable to:
measure a radial velocity of the head;
determine a seek distance in response to the radial velocity; and
seek the head the seek distance to the first track.

4. The disk drive as recited in claim 3, wherein the control circuitry is further operable to determine the seek distance according to:

$$Vel \times Sample\_Periods$$

where:
Sample_Periods is a number of servo sectors the head will pass over during a predetermined time interval; and
Vel is a number of tracks crossed per Sample_Period.

5. The disk drive as recited in claim 2, wherein the control circuitry is further operable to:
seek the head from the first track to a second track using a first idle mode seek profile; and
seek the head from the second track to a third track using a normal seek profile,
wherein at least one of an acceleration and deceleration of the first idle mode seek profile is less than an acceleration and deceleration of the normal seek profile.

6. The disk drive as recited in claim 5, wherein:
when entering the idle mode the control circuitry is further operable to seek the head to an idle mode track using a second idle mode seek profile; and
at least one of an acceleration and deceleration of the second idle mode seek profile is less than an acceleration and deceleration of the normal seek profile.

7. A method of operating a disk drive, the disk drive comprising a head actuated over a disk comprising a plurality of tracks, wherein each track comprises a plurality of servo sectors, the method comprising:
when entering an idle mode, disabling a servo control system operable to actuate the head over the disk in order to float the head over the disk; and when exiting the idle mode:
  enabling the servo control system;
  measuring a radial velocity of the head;
  determining a seek distance in response to the radial velocity; and
  seeking the head the seek distance to a first track,
wherein the disk drive further comprises a seek servo compensator and a settle servo compensator for controlling movement of the head,
wherein the method further comprises:
  seeking the head toward the first track using the seek servo compensator;
  initializing the settle servo compensator with initial values; and
  settling the head on the first track using the settle servo compensator,
wherein the initial values are generated according to a performance index:

$$\sum_{k=0}^{\infty} X(k)^T \cdot Q \cdot X(k)$$

where:
X(k) represents internal states of the settle servo compensator;
X(0) represents an initial state initialized with the initial values; and
Q is a weighting matrix optimized to reduce acoustic noise.

8. A method of operating a disk drive, the disk drive comprising a head actuated over a disk comprising a plurality of tracks, wherein each track comprises a plurality of servo sectors, and a seek servo compensator and a settle servo compensator for controlling movement of the head, the method comprising:
  when entering an idle mode, floating the head over the disk; and
  when exiting the idle mode:
    seeking the head toward a first track using the seek servo compensator;
    initializing the settle servo compensator with initial values; and
    settling the head on the first track using the settle servo compensator,
  wherein the initial values are generated according to a performance index:

$$\sum_{k=0}^{\infty} X(k)^T \cdot Q \cdot X(k)$$

where:
X(k) represents internal states of the settle servo compensator;
X(0) represents an initial state initialized with the initial values; and
Q is a weighting matrix optimized to reduce acoustic noise.

9. The method as recited in claim 8, further comprising when exiting the idle mode:
  measuring a radial velocity of the head;
  determining a seek distance in response to the radial velocity; and
  seeking the head the seek distance to the first track.

10. The method as recited in claim 9, further comprising determining the seek distance according to:

Vel×Sample_Periods where:
Sample_Periods is a number of servo sectors the head will pass over during a predetermined time interval; and
Vel is a number of tracks crossed per Sample_Period.

11. The method as recited in claim 8, further comprising:
  seeking the head from the first track to a second track using a first idle mode seek profile; and
  seeking the head from the second track to a third track using a normal seek profile,
  wherein at least one of an acceleration and deceleration of the first idle mode seek profile is less than an acceleration and deceleration of the normal seek profile.

12. The method as recited in claim 11, wherein:
  when entering the idle mode further comprising seeking the head to an idle mode track using a second idle mode seek profile; and
  at least one of an acceleration and deceleration of the second idle mode seek profile is less than an acceleration and deceleration of the normal seek profile.

* * * * *